United States Patent Office.

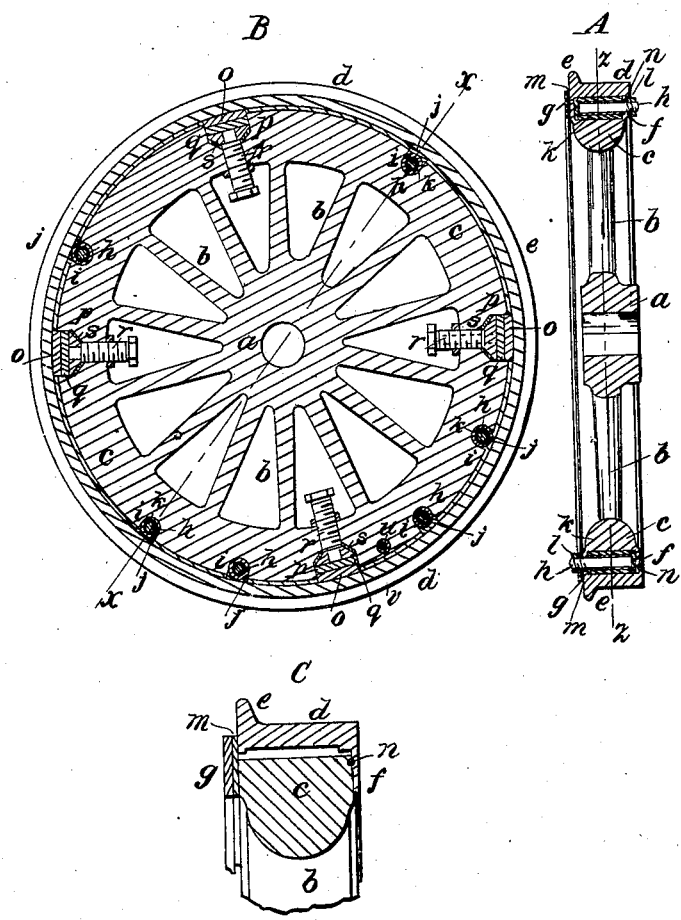

JOHN RADDIN, OF LYNN, MASSACHUSETTS.

*Letters Patent No. 76,811, dated April 14, 1868.*

IMPROVED CAR-WHEEL.

The Schedule referred to in these Letters Patent and making part of the same.

TO ALL WHOM IT MAY CONCERN:

Be it known that I, JOHN RADDIN, of Lynn, in the county of Essex, and State of Massachusetts, have invented an Improvement in Railway-Wheels; and I do hereby declare that the following, taken in connection with the drawings which accompany and form part of this specification, is a description of my invention, sufficient to enable those skilled in the art to practise it.

My improvement relates particularly to the construction of locomotive driver-wheels, though applicable to other flanged metal wheels, the object of the invention being to interpose between the hub and the tread and flange of the wheel, elastic material, so arranged as to support or cushion the locomotive at all times against elastic surfaces, to save it from the effects of jars, and also so disposed as to cushion the wheel laterally as well as radially, the elastic bearings being so applied as not to detract from the strength and safety of the wheel.

My invention consists primarily in making the tire separate from the body of the wheel, with an inwardly-projecting flange on its side opposite to the rail-flange, the body of the wheel setting into this tire, and having an elastic packing so disposed as to prevent contact of the side or felloe of the wheel with the adjacent surface of the tire-flange, and the opposite surface of the felloe also having a flange, projecting over the tire-face, from contact with which face it is kept by an elastic packing, the felloe and tire being connected by a series of cross-bolts, the bolts being so applied as to provide for slight radial play of the wheel, they being for this purpose inserted through tubular elastic packing, and extending through holes of greater diameter than their own diameter, the periphery of the felloe being also preferably provided with a series of sockets, in which are blocks, seated on elastic cushions, which blocks are pressed outwardly by radial screw-bolts.

The drawings represent a wheel, embodying my improvement, A showing a central cross-section, on the line $x\ x$; B, a section on the line $z\ z$.

$a$ denotes the hub, $b$ the spokes, and $c$ the felloe, formed integrally of metal; $d$ is the metal tire, having the usual rail-flange $e$. This tire is not cast or formed with or upon the felloe $c$, but is a separate ring encompassing the felloe. On the surface, opposite the flange $e$, it has a flange, $f$, projecting inwardly, as seen at A, and also as seen at C, which represents a cross-section of the tire and felloe.

The wheel or felloe is smaller in diameter than the inner diameter of the tire, leaving an annular space between the adjacent surfaces, as seen at B and C, which space is filled at points around the wheel by elastic cushions, as will be presently described.

The thickness of the felloe corresponds to the thickness of the tire $d$, from the inner surface of the flange to the opposite face of the tire, and on the face of the felloe, opposite the flange $f$, is a ring, $g$, the outer edge of which projects over the tire, as seen at A and C, this ring being fixed to the face of the felloe, either by being cast thereupon or therewith, so as to form an integral part thereof, or by being bolted thereto.

The tire and felloe are bolted together by a series of bolts, $h$, passing, some through the felloe and through the tire-flange $f$, with nuts on the face of the flange $f$, and some through the felloe and through the ring or flange $g$, with nuts on the outer surface of flange $g$, as seen at A. Sockets or recesses $i$ are sunk in the circumferential surface of the felloe, for reception of these bolts. The shank of the bolt is first covered by a tubular elastic sleeve, $k$, the bolt is then dropped into its socket, $i$, and its threaded end is passed through the hole made for it in the flange $f$, or in the flange $g$, as seen at A; this hole being large enough to admit of slight radial play of the bolt. The bolts being all thus inserted, nuts $l$ are applied to their outer ends, and the heads of the bolts are drawn towards the respective flanges, thus causing the felloe on both sides to be cushioned by the ends of the elastic tubes. The felloe may be further protected against the lateral swaying tendencies of the tire by an elastic ring or washer, $m$, interposed between the ring or flange $g$ and the adjacent surface of the tire, and also by an elastic ring or washer, $n$, interposed between the opposite surface of the felloe and the tire-flange $f$; or holes $u$ may be bored through the felloe, and filled with rubber or other elastic material, $v$, the ends of which project beyond the felloe, and press against the flanges.

This manner of constructing and connecting the felloe and tire, with provision for relieving the main body of the wheel, and thereby the locomotive or car supported on such wheels, of the effects of the lateral jolts or jars caused by contact of the flange e with the track-rail, adds materially to the power of endurance in the locomotive or car, and causes the same to run more easily and smoothly than when no such provision is made, or where the felloe and tire are cast in one piece, and are free from elastic connection.

The bolts h may be so disposed that the outer surfaces of the elastic tubes k, which surround them, project out beyond the periphery of the felloe, and across the space between the felloe and the tire, the tire and felloe being thus radially and relatively supported by these elastic tubes, which yield when they are undermost, and the felloe rests upon them, as will be readily understood. Preferably, however, each elastic tube has on its outer surface a shoe, j, interposed between the elastic surface and the surface of the tire, the tire resting directly against this shoe, as shown at B, and the cushions k may be simply placed in sockets in the periphery of the felloe, independent from the bolts, in which case I prefer to make them solid instead of tubular.

The same result may be attained by employing metal seat-blocks or caps, o, resting in sockets p, in the felloe-periphery, and against elastic cushions or springs q, the caps o extending across the space between the tire and periphery, as seen at B, and being pressed outwardly with whatever pressure is desirable, by radial screws r, working in screw-threads cut through the felloe, and against blocks s, upon which the cushions rest; or the cushions q may themselves project out against the tire-surface.

Each screw r may be made tubular, with a bolt extending through it, the head of which bears upon the surface of the cap o, while its shank bears a nut, this screw-bolt holding the cap in position, or allowing it to be drawn inwards in setting up the wheel, or in taking it to pieces, the nut being loosened, when the wheel has to be put together, to allow the cap to be pressed out by its screw.

I claim, in combination with the felloe c, the tire d, having a flange, f, projecting over the face of the felloe, the felloe and tire being bolted together, and having elastic cushions so disposed as to receive the direct lateral strain upon the felloe or tire, substantially as described.

I also claim, combining with the felloe and tire, made relatively movable, the elastic cushions, k, placed in recesses in the felloe-periphery, and bearing, either directly or through the shoes j, upon the tire, substantially as shown and described.

I also claim the elastic cushions or springs q, placed in the sockets p, and resting upon seats s, with means for forcing out the cushion radially, the cushions being surfaced by a cap, o, or bearing directly against the tire, substantially as described.

JOHN RADDIN.

Witnesses:
J. B. CROSBY,
FRANCIS GOULD.